US008670238B2

(12) United States Patent
Wang et al.

(10) Patent No.: US 8,670,238 B2
(45) Date of Patent: Mar. 11, 2014

(54) GUIDE RAIL SYSTEM AND A METHOD FOR PROVIDING HIGH-DENSITY MOUNTING OF OPTICAL COMMUNICATIONS MODULES

(75) Inventors: Fang Wang, San Ramon, CA (US); David J. K. Meadowcroft, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 137 days.

(21) Appl. No.: 13/362,681

(22) Filed: Jan. 31, 2012

(65) Prior Publication Data

US 2013/0194753 A1 Aug. 1, 2013

(51) Int. Cl.
*H05K 7/20* (2006.01)

(52) U.S. Cl.
USPC ........... 361/716; 361/704; 361/715; 361/719; 361/720; 165/185

(58) Field of Classification Search
USPC ........... 361/704, 715–716, 719–720; 165/185
See application file for complete search history.

(56) References Cited

U.S. PATENT DOCUMENTS

| | | | | |
|---|---|---|---|---|
| 5,980,324 | A | 11/1999 | Berg et al. | |
| 6,304,436 | B1 | 10/2001 | Branch et al. | |
| 6,305,848 | B1 | 10/2001 | Gregory | |
| 6,469,905 | B1 | 10/2002 | Hwang | |
| 6,532,155 | B2 | 3/2003 | Green et al. | |
| 6,811,326 | B2 * | 11/2004 | Keeble et al. | 385/92 |
| 6,824,429 | B2 * | 11/2004 | Hwang | 439/607.2 |
| 7,048,452 | B2 | 5/2006 | Malagrino, Jr. | |
| 7,177,157 | B2 | 2/2007 | Aronson et al. | |
| 7,377,702 | B2 | 5/2008 | Jablonski et al. | |
| 7,425,098 | B2 * | 9/2008 | Meadowcroft et al. | 385/92 |
| 7,452,216 | B2 * | 11/2008 | Murr et al. | 439/74 |
| 7,601,025 | B1 * | 10/2009 | Phillips | 439/541.5 |
| 7,606,497 | B2 | 10/2009 | Mizue | |
| 7,804,696 | B2 | 9/2010 | Kim | |
| 7,918,678 | B2 | 4/2011 | Cole et al. | |
| 7,983,052 | B2 * | 7/2011 | Jiang | 361/741 |
| 8,345,426 | B2 * | 1/2013 | Nichols | 361/715 |
| 8,467,190 | B2 * | 6/2013 | Yi et al. | 361/704 |

* cited by examiner

*Primary Examiner* — Robert J Hoffberg

(57) ABSTRACT

A guide rail system is provided that allows multiple optical communications modules to be mounted in close proximity to one another on a host circuit board. A first portion of the guide rail system is secured to a bottom surface of the host circuit board at locations on the bottom surface of the circuit board adjacent an opening formed in the circuit board. A second portion of the guide rail system is disposed on bottom surfaces of the optical communications modules. The first portion includes one or more pairs of rails and the second portion includes one or more guide blocks configured to slidingly engage the rails. The opening formed in the circuit board allows the rails to be accessed and also allows heat from the module to be dissipated down into the first portion and then into a heat dissipation structure secured to the first portion.

21 Claims, 6 Drawing Sheets

GUIDE RAIL SYSTEM AND A METHOD FOR PROVIDING HIGH-DENSITY MOUNTING OF OPTICAL COMMUNICATIONS MODULES

TECHNICAL FIELD OF THE INVENTION

The invention relates to optical communications systems. More particularly, the invention relates to a guide rail system and method for high-density mounting of multiple optical communications modules.

BACKGROUND OF THE INVENTION

An optical communications module is a module having one or more transmit (TX) channels, one or more receive (RX) channels, or both. An optical transceiver module is an optical communications module that has one or more TX channels and one or more RX channels in the TX and RX portions, respectively, of the transceiver module. The TX portion comprises components for transmitting data in the form of modulated optical signals over one or more optical waveguides, which are typically optical fibers. The TX portion includes at least one laser driver circuit and at least one laser diode. The laser driver circuit outputs electrical signals to the laser diode to modulate it. When the laser diode is modulated, it outputs optical signals that have power levels corresponding to logic 1s and logic 0s. An optics system of the transceiver module focuses the optical signals produced by the laser diode into the end of a respective transmit optical fiber held within a connector that mates with the transceiver module. An optical receiver module is an optical communications module that has the RX portion, but does not have the TX portion. An optical transmitter module is an optical communications module that has the TX portion, but does not have the RX portion.

Optical communications modules typically include one or more integrated circuits (ICs) for controlling the operations of the module. For example, an optical transmitter module typically also includes a controller IC that controls the laser driver circuit and other operations of the module. An optical receiver module typically includes a receiver IC that processes the signals received over the optical fiber to recover the data, as well as other operations of the module. An optical transceiver module typically includes a controller IC and a receiver IC.

Optical communications modules are often mounted on host circuit boards by sliding the modules into metal cages that are mounted on the host circuit boards. The cage not only supports the module mechanically, but also functions as an electromagnetic interference (EMI) shielding apparatus. In order to adequately perform the EMI shielding function, the cage must surround the module entirely except for small openings. Due to the module being surrounded by the cage, it is difficult to dissipate heat generated by the module. The heat dissipation problem makes the cage unsuitable for use with high-power optical communications modules and parallel optical communications modules that have multiple TX and/or RX channels and associated circuitry. In addition, the sides of the cage add to the total width of the optical communications system and reduce the number of optical communications system that can be mounted in a limited space on the circuit board. Furthermore, when such cages are used, the back side of the host circuit board is left unused for cooling.

It is known to use guide rail systems that do not require cages for mounting optical communications modules on a host circuit board. However, most, if not all, of the known guide rail systems have side walls or latch systems that protrude to the sides of the module. Similar to cages, these side walls and latch systems add to the total width of the optical communications system and therefore prevent high-density deployment of the optical communications systems. In addition, there is no back-side cooling capability in these systems.

Accordingly, a need exists for a guide rail system that accommodates high-density mounting of optical communications modules on a host circuit board while also providing adequate heat dissipation.

SUMMARY OF THE INVENTION

The invention is directed to a guide rail system for mounting one or more optical communications modules on a host circuit board and method for using a guide rail system for mounting one or more optical communications modules on a host circuit board.

The guide rail system comprises a first portion and a second portion. The first portion of the guide rail system has a top surface and a bottom surface. The top surface of the first portion is secured to a bottom surface of the host circuit board at locations on the bottom surface of the circuit board that are adjacent to an opening formed in the circuit board. The first portion comprises a back plate and a subassembly, both of which comprise a thermally-conductive material. The back plate has a top surface and a bottom surface. The subassembly is mounted on the top surface of the back plate. The subassembly comprises a plurality of pairs of parallel guide rails. Each guide rail has a groove therein that extends along the respective guide rail. Each pair of guide rails defines a track that is parallel to the grooves and the guide rails. The grooves on opposite sides of each track are spaced apart by a predetermined distance. The second portion of the guide rail comprises at least a first guide block that is disposed on a bottom surface of a first optical communications module. The guide block has side edges that extend along opposite sides of the guide block. The side edges are parallel to one another and are spaced apart by approximately the same predetermined distance. The side edges are slidingly engaged with the grooves of a first pair of adjacent guide rails to enable the first optical communications module to slide within the track defined by the first pair of adjacent guide rails in directions that are parallel to the grooves of the first pair.

The method comprises providing a host circuit board that has an opening formed therein where a portion of the circuit board is absent. The method further comprises providing a guide rail system that comprises a first portion and a second portion. The first portion of the guide rail system has a top surface and a bottom surface. The top surface of the first portion is secured to the bottom surface of the circuit board at locations on the bottom surface of the circuit board that are adjacent the opening formed in the circuit board. The first portion comprises a back plate and a subassembly. The back plate and the subassembly comprise a thermally-conductive material. The back plate has a top surface and a bottom surface. The subassembly is mounted on the top surface of the back plate and comprises a plurality of pairs of parallel guide rails. Each guide rail has a groove therein that extends along the respective guide rail. Each pair of guide rails defines a track that is parallel to the grooves and to the guide rails. The grooves on opposite sides of each track are spaced apart by a predetermined distance.

The second portion of the guide rail system comprises at least a first guide block disposed on a bottom surface of a first optical communications module. The first guide block has side edges that extend along opposite sides of the first guide block. The side edges are parallel to one another and are spaced apart by approximately the same predetermined distance as the distance between the grooves on opposite sides of a track. The method further comprises slidingly engaging the side edges of the first guide block with the grooves of a first pair of adjacent guide rails to enable the first optical communications module to slide within the track defined by the first pair of adjacent guide rails in directions that are parallel to the grooves of the first pair.

These and other features and advantages of the invention will become apparent from the following description, drawings and claims.

DETAILED DESCRIPTION OF AN ILLUSTRATIVE EMBODIMENT

Figure 1:
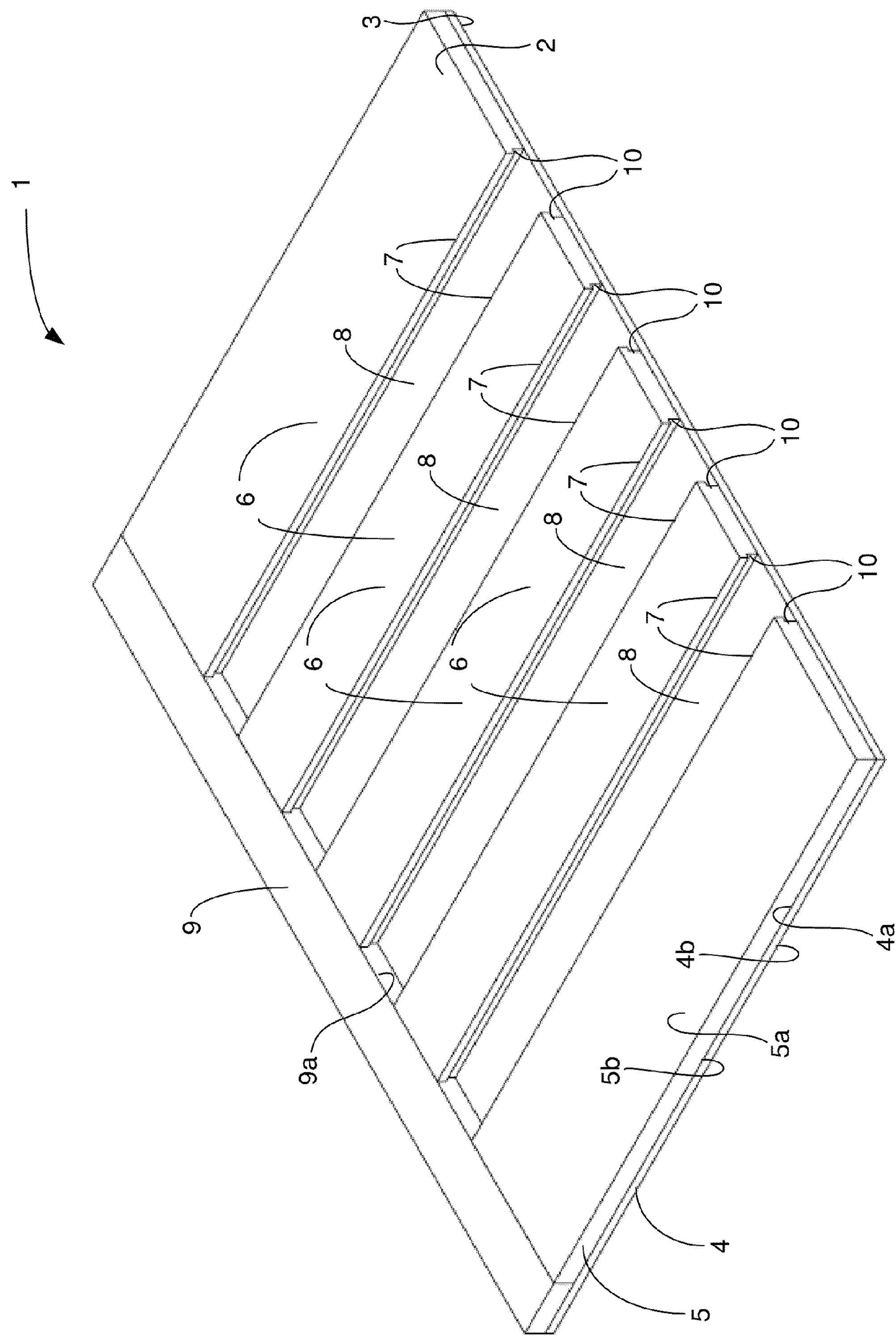
FIG. 1 illustrates a top perspective view of a first portion of the guide rail system in accordance with an illustrative, or exemplary, embodiment.

In accordance with the invention, a guide rail system is provided that allows multiple optical communications modules to be mounted in close proximity to one another on a host circuit board. A first portion of the guide rail system is secured to a bottom surface of the host circuit board and a second portion of the guide rail system is disposed on a bottom surface of the optical communications modules. The first portion of the guide rail system includes one or more pairs of rails and the second portion of the guide rail system includes one or more guide blocks disposed on bottom surfaces of one or more respective optical communications modules. The host circuit board has an opening, or cutaway region, formed therein at the location where the first portion of the guide rail system is secured to the bottom surface of the circuit board. This opening allows the rails of the first portion of the guide rail system to be accessed through the opening, and also allows heat from the module to be dissipated down into the guide rail system and then from the guide rail system into a heat dissipation structure disposed on the bottom surface of the first portion of the guide rail system.

The guide blocks disposed on the bottom surfaces of the respective optical communications modules slidingly engage the respective pairs of rails to thereby mechanically couple the optical communications modules to the host circuit board. At least some of the heat generated by the optical communications modules passes from the modules into the guide blocks of the second portion of the guide rail system, and then from the guide blocks into the first portion of the guide rail system. The heat then passes from the first portion of the guide rail system into a heat dissipation structure disposed on the first portion of the guide rail system. Illustrative, or exemplary, embodiments will be described below with reference to FIGS. 1-6, in which like reference numerals represent like components, elements or features.

As indicated above, optical communications modules are often inserted into cages that are mounted on a top surface of a host circuit board. Such cages consume a relatively large amount of space on the circuit boards and therefore make it difficult or impossible to densely mount multiple optical communications modules in close proximity to one another on the circuit board. In addition, in such arrangements, the bottom surface of the host circuit board is not used for heat dissipation. Although guide rail systems are known that do not require cages for mounting optical communications modules on a host circuit board, most, if not all, of the known guide rail systems have side walls or latch systems that protrude to the sides of the module and therefore add to the total width of the optical communications module. The space that is consumed by these side walls or side-protruding latches prevents high-density deployment of the optical communications modules. In addition, there is no back-side cooling capability in these systems.

The guide rail system of the invention obviates the need for a cage and allows optical communications modules to be mounted on the host circuit board in very close proximity to one another. The latching mechanisms are underneath the optical communications modules and therefore do not consume lateral space, which facilitates high-density, side-by-side deployment on the host circuit board. In addition, because a portion of the host circuit board is removed to form the opening for accessing the guide rails, heat generated by the modules passes down from the second portion of the guide rail system into the first portion of the guide rail system, and then from the first portion of the guide rail system into a heat dissipation structure disposed on a bottom surface of the first portion of the guide rail system. Thus, the invention achieves the goals of high-density mounting and good heat dissipation, as will now be described with reference to the illustrative embodiments shown in FIGS. 1-6.

FIG. 1 illustrates a top perspective view of the first portion 1 of the guide rail system in accordance with an illustrative, or exemplary, embodiment. As will be described below with reference to FIG. 2, the first portion 1 is secured to the bottom surface of the host circuit board around the edges of the opening, or cutaway region, formed in the host circuit board. The first portion 1 is made of a thermally conductive material, such as aluminum or steel. The first portion 1 has a top surface 2 and a bottom surface 3. The first portion 1 includes a back plate 4 and a subassembly 5. The back plate 4 has a top surface **4*a* and a bottom surface 4*b*. The subassembly 5 includes pairs 6 of parallel guide rails 7 and a panel 9. The pairs 6 of parallel guide rails 7 and the top surface 4*a* of the back plate 4 form tracks 8. The tracks 8 define directions of travel for the optical communications modules (not shown), as will be described below with reference to FIG. 2. The directions of travel are parallel to the rails 7. The rails 7 have grooves 10 formed in them that are parallel to the rails 7 and extend the length of the rails 7**.

The panel 9 has a side 9*a* that is perpendicular to the tracks 8 and that abuts the ends of the rails 7 and tracks 8. The subassembly 5 has a top surface 5*a* that corresponds to the top surface 2 of the first portion 1 of the guide rail system. The bottom surface 4*b* of the back plate 4 corresponds to the bottom surface 3 of the first portion 1 of the guide rail system. The bottom surface 5*b* of the subassembly 5 is secured to the top surface 4*a* of the back plate 4.

Figure 2:
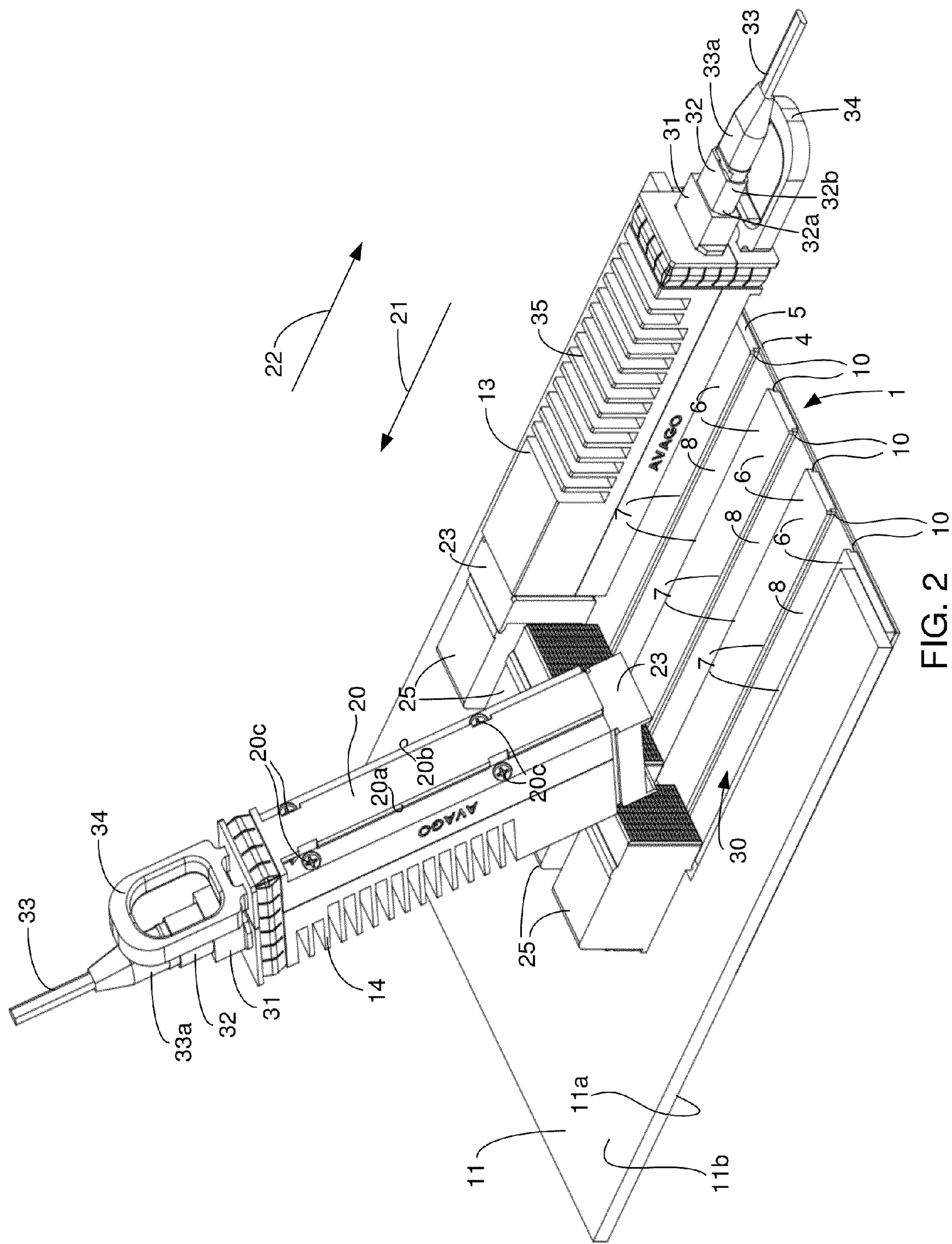
FIG. 2 illustrates a top perspective view of a host circuit board having the first portion of the guide rail system shown in FIG. 1 secured to its bottom surface and having an optical communications system slidingly engaged with the first portion via a second portion of the guide rail system that is disposed on the bottom surface of the optical communications module.

FIG. 2 illustrates a top perspective view of a host circuit board 11 having the first portion 1 of the guide rail system shown in FIG. 1 secured to its bottom surface 11*a* and having a first optical communications module 13 mounted on the host circuit board via the guide rail system. FIG. 2 also illustrates a bottom perspective view of a second optical communications module 14 that is identical to the first optical communications module 13, but that is flipped over to allow the guide block 20 of the guide rail system to be seen. The guide block 20 corresponds to the second portion of the guide rail system, and will be referred to herein interchangeably as the "guide block" or as the "second portion." The first and second portions 1 and 20 of the guide rail system will be referred to collectively herein as "the guide rail system 1, 20."

The host circuit board 11 has an opening, or cutaway region, 30 formed therein to allow the rails 7 and tracks 8 to be accessed. The top surface 2 of the first portion 1 of the guide rail system is fixedly secured to the bottom surface 11*a* of the host circuit board 11 along areas of the bottom surface 11*a* that are adjacent the edges of the opening 30. Typically, a thermally-conductive epoxy (not shown) is used to fixedly secure the top surface 2 of the first portion 1 to the bottom surface 11*a* of the host circuit board 11.

The guide blocks 20 that are secured to, or integrally formed in, the bottom surfaces of the optical communications modules 13 and 14 have side edges 20*a* and 20*b* that are parallel to each other and that extend along the length of the guide block 20. The guide block 20 is sized and shaped to match the size and shape of the tracks 8 such that the edges 20*a* and 20*b* of the guide block 20 are received in the grooves 10 of the guide rail system and travel within the grooves 10 with a sliding motion. Thus, the guide block 20 slidingly engages the pair 6 of parallel guide rails 7 to restrict the module 13 to the directions indicated by arrows 21 and 22.

The optical communications modules 13 and 14 have electrical connectors 23 on their distal ends for mating with respective electrical connectors 25 mounted on the top surface 11*b* of the host circuit board 11. Through these electrical connectors 23 and 25, electrical circuitry (not shown for purposes of clarity) of the modules 13 and 14 are electrically interconnected with electrical circuitry (not shown for purposes of clarity) of the host circuit board 11 and/or with electrical circuitry of devices (not shown) that are mounted on the host circuit board 11. The side 9*a* (FIG. 1) of the panel 9 acts as a stop that prevents the modules 13 and 14 from moving so far in the direction indicated by arrow 21 that they damage to electrical connectors 25.

The modules 13 and 14 have optical receptacles 31 on their proximal ends that are mated with a first end 32*a* of a sleeve 32. A second end 32*b* of the sleeve 32 is mated with an optical connector 33*a* that terminates an end of an optical fiber cable 33. The optical fiber cable 33 contains at least one optical fiber, but typically contains a plurality of optical fiber ribbon cables (not shown for purposes of clarity) that connect with a plurality of respective optical communications modules (not shown for purposes of clarity) mounted within each of the optical communications modules 13 and 14. A latching mechanism 34 is used to latch and delatch the module 13 to and to from the first portion 1 of the guide rail system, as will be described below in more detail with reference to FIGS. 4-6. The modules 13 and 14 may have heat sink structures 35 secured to their top surfaces or integrated into the module housings to assist in dissipating heat generated by the modules 13 and 14.

Figure 3:
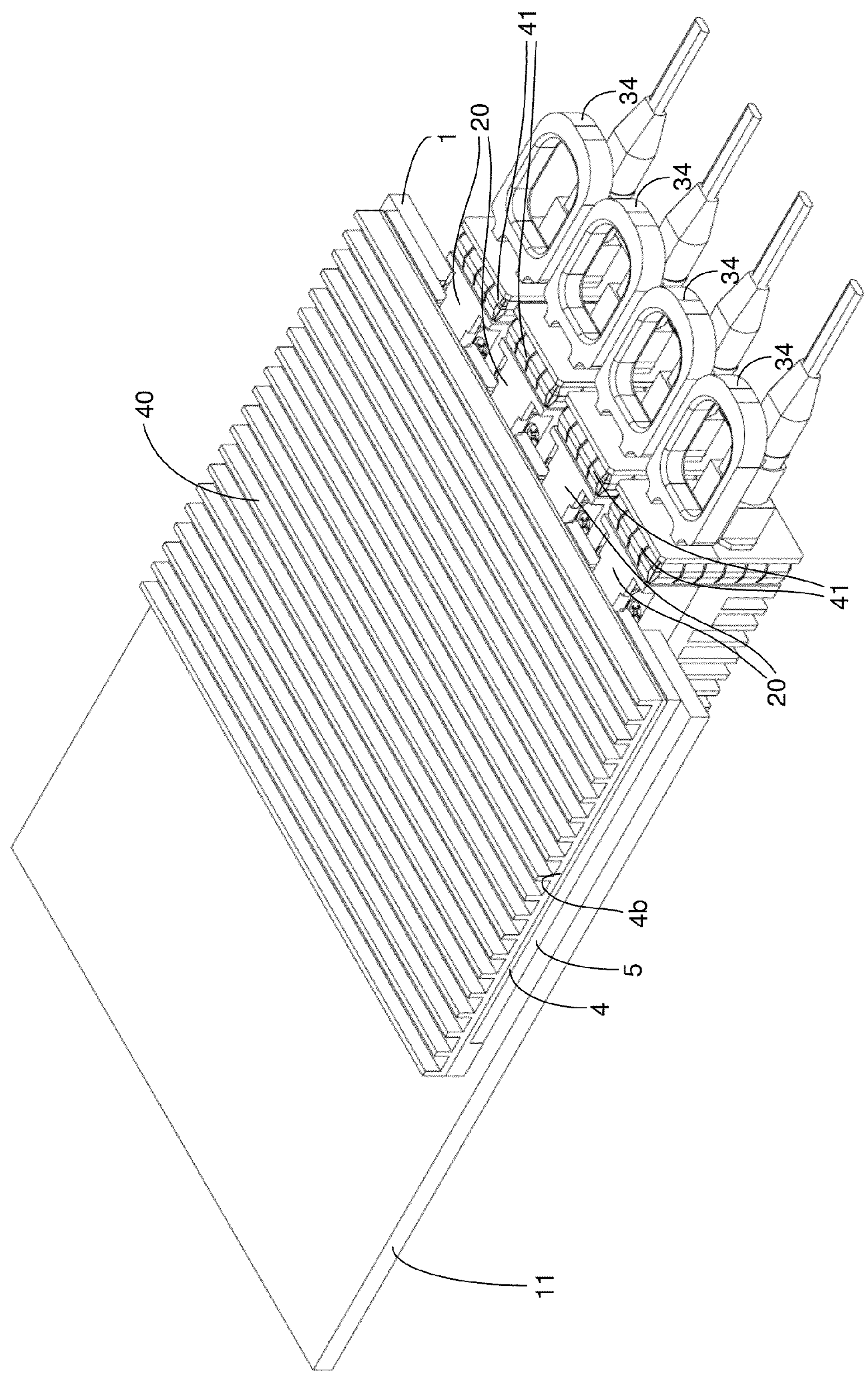
FIG. 3 illustrates a bottom perspective view of the host circuit board and guide rail system shown in FIG. 2 having a heat dissipation structure disposed on the bottom surface of the first portion of the guide rail system shown in FIGS. 1 and 2.

FIG. 3 illustrates a bottom perspective view of the host circuit board 11 and of the guide rail system 1, 20 shown in FIG. 2 with a heat dissipation structure 40 disposed on the bottom surface 4*b* of the back plate 4 of the guide rail system 1, 20. In FIG. 3, four optical communications modules 41 are shown removably secured to the host circuit board 11 via the guide rail system 1, 20. The guide rail system 1, 20 is made of a thermally conductive material, such as, for example, aluminum or steel. At least some of the heat that is generated by the optical communications modules 41 flows from the modules 41 into the guide blocks 20 of the guide rail system 1, 20. At least some of the heat that flows into the guide blocks 20 subsequently flows through the subassembly 5 into the back plate 4. At least some of the heat that flows into the back plate 4 subsequently flows into the heat dissipation structure 40 where it is dissipated.

It can be seen from the above description of FIGS. 1-3 that the guide rail system 1, 20 allows the optical communications modules to be mounted in very close proximity to one another on the host circuit board 11. In addition, because the first portion 1 of the guide rail system 1, 20 is secured to the bottom surface 11*a* of the host circuit board 11, the heat dissipation structure 40 attached to the bottom surface 3 of the first portion 1 dissipates heat generated by the modules from the back side of the host circuit board 11. Thus, the guide rail system achieves the dual goals of high-density mounting and heat dissipation.

The invention is not limited to the guide rail system 1, 20 having any particular configurations. As will be understood by persons skilled in the art in view of the description being provided herein, a variety of configurations may be used for the guide rail system 1, 20. One important feature of the guide rail system 1, 20 is that it is beneath the optical communications modules rather than along side them. This feature, along with the elimination of the cage, allows multiple modules to be mounted side by side on the host circuit board 11 in very close proximity to one another. Another illustrative, or exemplary, embodiment of the guide rail system will now be described with reference to FIGS. 4-6.

Figure 4:
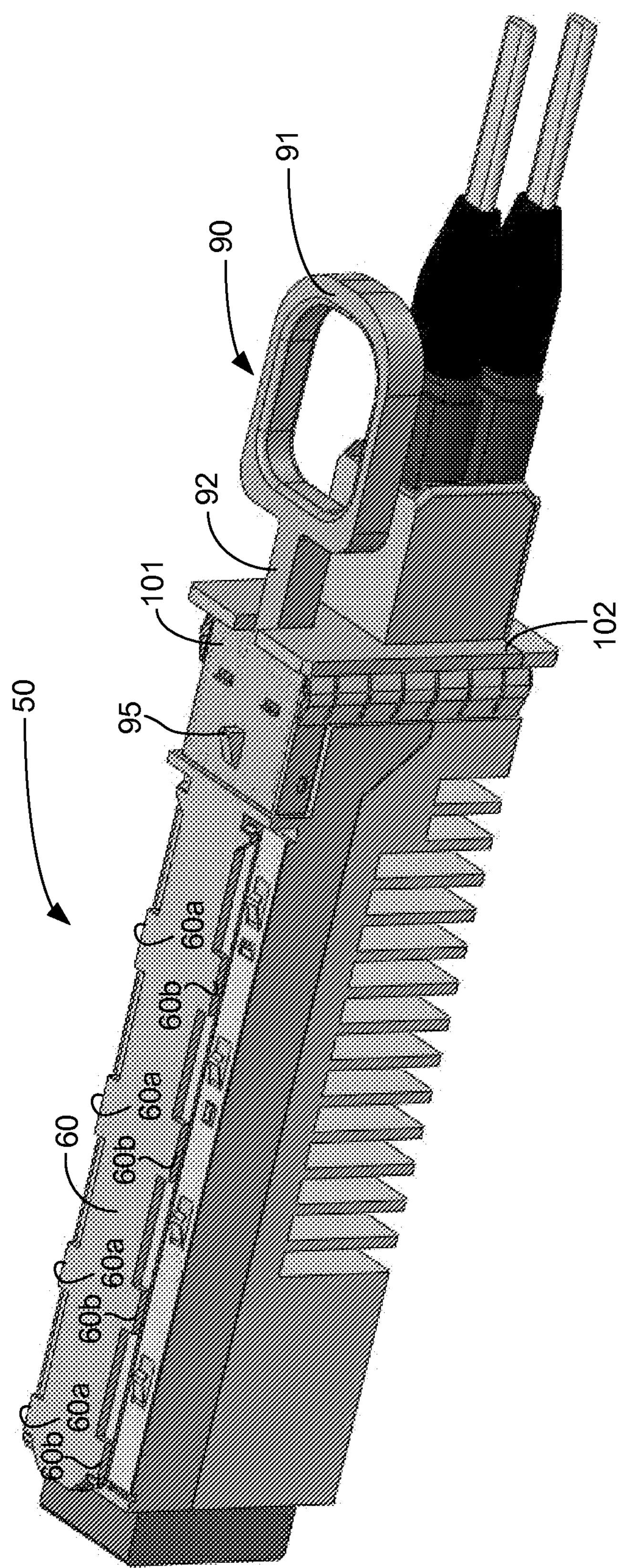
FIG. 4 illustrates a bottom perspective view of an optical communications module having the second portion of the guide rail system in accordance with another illustrative embodiment secured to the bottom surface of the module.
Figure 5:
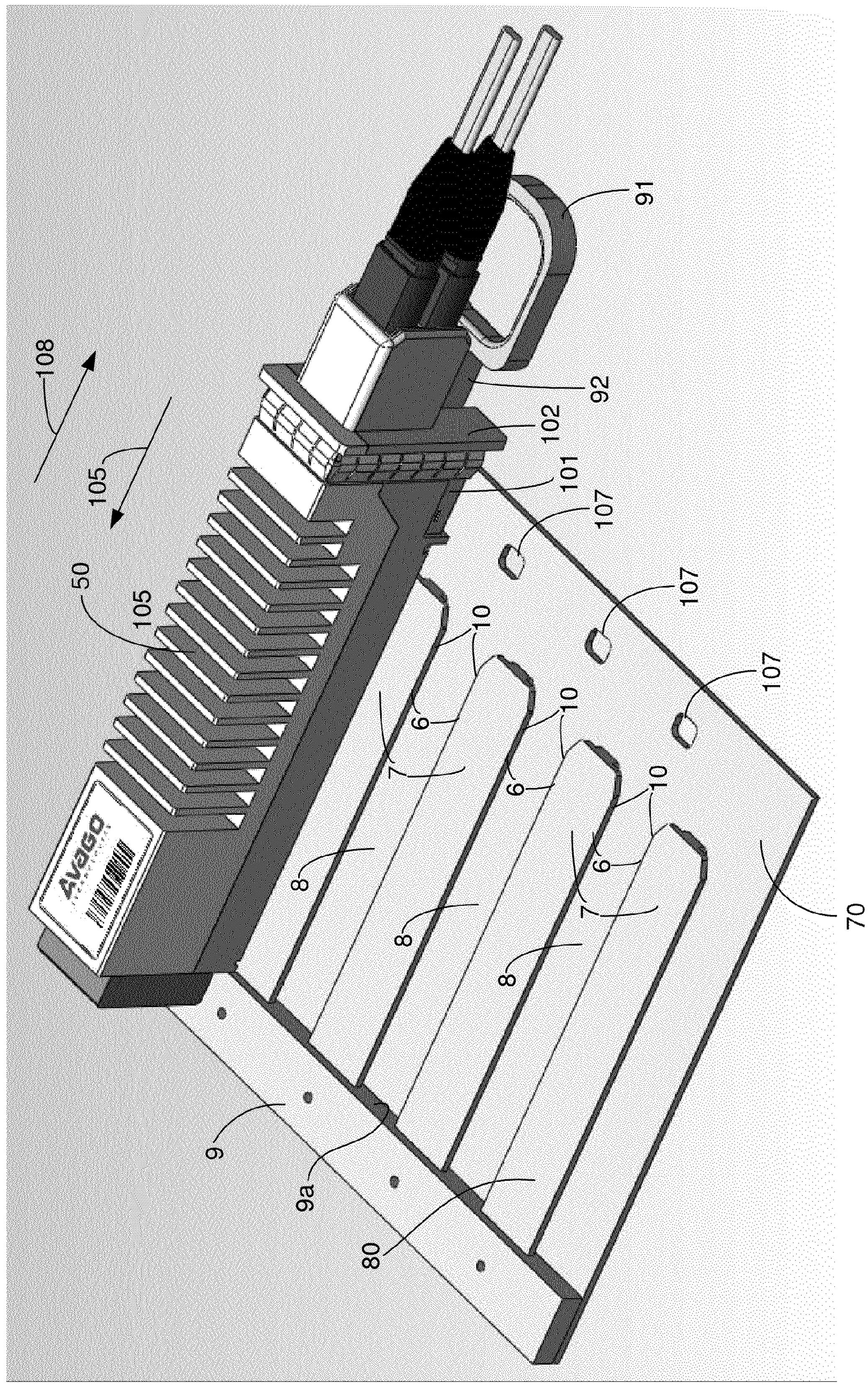
FIG. 5 illustrates a top perspective view of a host circuit board having the optical communications module shown in FIG. 4 mounted thereon via the second portion of the guide rail system shown in FIG. 4 and a first portion of the guide rail system in accordance with another illustrative embodiment.

FIG. 4 illustrates a bottom perspective view of an optical communications module 50 having a guide block 60 secured to its bottom surface. FIG. 5 illustrates a top perspective view of the optical communications module 50 shown in FIG. 4 mounted on a back plate 70 and subassembly 80 that are similar to the back plate 4 and subassembly 5, respectively, shown in FIGS. 1 and 2. The guide block 60 is very similar to the guide block 20 shown in FIG. 2 except that side edges 20*a* and 20*b* of the guide block 20 are continuous along the length of the guide block 20, whereas the edges 60*a* and 60*b* of the guide block 60 are discontinuous along the length of the guide block 60. Like the edges 20*a* and 20*b*, the edges 60*a* and 60*b* travel within the grooves 10 of the rails 7 in the same manner as that described above with reference to FIG. 2.

Figure 6:
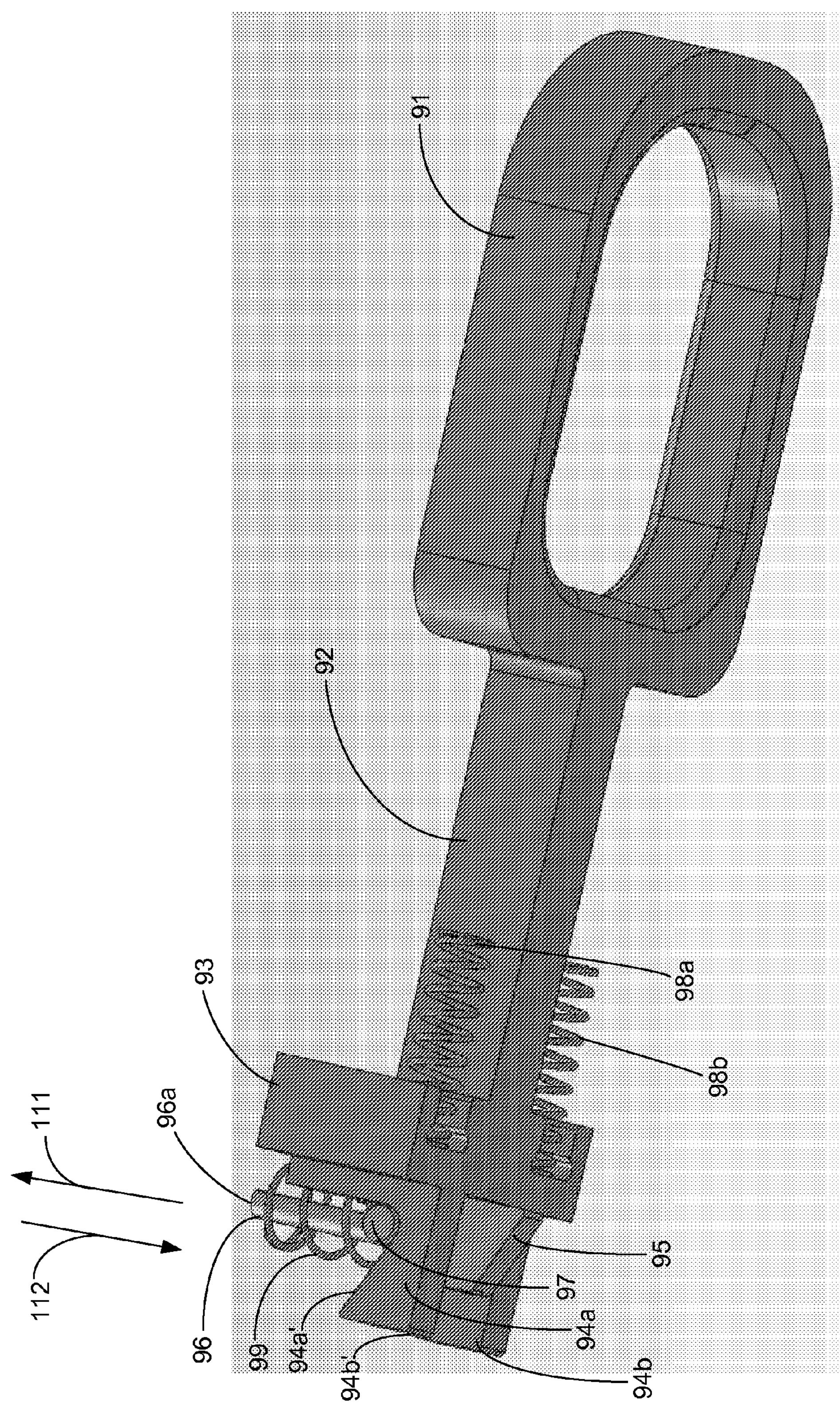
FIG. 6 illustrates a perspective view of a latching mechanism of the optical communications module shown in FIG. 5 used for latching and delatching the optical communications module to and from the guide rail system.

FIG. 6 illustrates a perspective view of the latching mechanism 90 of the optical communication module 50 shown in FIG. 5. The latching mechanism 90 will now be described with reference to FIGS. 4-6. The latching mechanism 90 includes a pull tab 91, a connecting bar 92, a transverse member 93, sloped members 94*a* and 94*b*, a latch 95, a vertical pin 96, a cross member 97, horizontal biasing springs 98*a* and 98*b*, a vertical biasing spring 99, a latching mechanism housing 101, and a back stop 102. The latching mechanism housing 101 and the back stop 102 are not shown in FIG. 6 to allow the parts that are housed within the housing 101 to be seen.

The latching mechanism 90, which is fixedly secured to the bottom surface of the optical communications module 50, works as follows. A person installs the module 90 by aligning the guide block 60 with the respective pair 6 of guide rails 7 and pushing the module 50 in the direction indicated by arrow 105 to slidingly engage the edges 60*a* and 60*b* of the guide block 60 with the respective grooves 10 of the respective rails 7. This causes the module 50 to slide in the direction of arrow 105 along the track 8. Once the module 50 abuts the side 9*a* of the panel 9, the latch 95 is latched within the opening 107, which locks the module 50 in the latched position shown in FIG. 5. In the latched position, the horizontal biasing springs 98*a* and 98*b*, which are compression springs, are in their uncompressed states shown in FIG. 6.

In order to delatch the module 50 to remove it from the track 8, a person uses a finger or a tool to grab the pull tab 91 and then pulls on the pull tab 91 in the direction indicated by arrow 108. As the pull tab 91 is pulled in this direction, the horizontal biasing springs 98*a* and 98*b* are compressed between the transverse member 93 and the back stop 102. In the compressed states, the springs 98*a* and 98*b* attempt to bias the module 50 forward in the direction indicated by arrow 105 (FIG. 5). As the springs 98*a* and 98 are compressed and the pull tab 91 is pulled in the direction indicated by arrow 108, the sloped members 94*a* and 94*b* exert forces on the pin 96 that are normal to their sloped surfaces 94*a*' and 94*b*'. The end 96*a* of the pin 96 opposite the latch 95 is held within a socket (not shown) of the module 50 that restricts the movement of the pin 96 to the directions indicated by arrows 111 and 112. The forces exerted by the sloped surfaces 94*a*' and 94*b*' have a horizontal component and a vertical component. The horizontal component is canceled out by the socket, leaving only the vertical component, which is parallel to the direction indicated by arrow 111 (FIG. 6). As the pin 96 moves in the direction indicated by arrow 111, the latch 95, which is fixedly secured to the pin 96, moves in the same direction. Once the pull tab 91 has been pulled a sufficient distance in the direction indicated by arrow 108 (FIG. 5), the sloped surfaces 94*a*' and 94*b*' of the sloped members 94*a* and 94*b*, respectively, will cause the pin 96 to move far enough in the direction indicated by arrow 111 (FIG. 6) to cause the latch 95 to clear the opening 107 (FIG. 5). The module 50 can then be completely removed from the track 8.

If the force being exerted on the pull tab 91 in the direction of arrow 108 is removed before the latch 95 has cleared the opening 107, the forces exerted by the horizontal biasing springs 98*a* and 98*b* will push the latching mechanism 90 in the direction indicated by arrow 105 (FIG. 5). The vertical biasing spring 99 is also a compression spring. The spring 99 is compressed between the cross member 97 and the bottom surface of the module 50 such that the latch 95 is constantly biased in the direction indicated by arrow 112 (FIG. 6). When the pull tab 91 is pulled in the direction indicated by arrow 108 (FIG. 5), the sloped members 94*a* and 94*b* move the pin 96 in the direction indicated by arrow 111 (FIG. 6), which causes the spring 99 to become more compressed. If this force is removed, the spring 99 exerts a force in the direction indicated by arrow 112 on the cross member 97 (FIG. 6), which pushes the latch 95 in the direction indicated by arrow 112 such that, if the latch 95 is positioned over the opening 107, it re-engages the opening 107.

The invention is not limited to using any particular latching mechanism. As will be understood by persons skilled in the art in view of the description provided herein, a variety of latching mechanisms may be designed for use with the guide rail system. One of the benefits of the design shown in FIG. 6 is that none of the components of the latching mechanism protrude from the side surfaces of the optical communications module 50. This feature facilitates high-density mounting of modules on the host circuit board in close side-by-side relationships.

It should be noted that the invention has been described with respect to a few illustrative embodiments for the purpose of describing the principles and concepts of the invention. The invention, however, is not limited to these illustrative embodiments. For example, while the invention has been described with reference to using particular configurations for the guide rail system and latching mechanism, the invention is not limited to these particular configurations. As will be understood by those skilled in the art in view of the description being provided herein, modifications may be made to the embodiments described to provide a guide rail system that achieves the goals of the invention, and all such modifications are within the scope of the invention.

What is claimed is:

1. A guide rail system for mounting one or more optical communications modules on a host circuit board, the guide rail system comprising:

the host circuit board having a top surface and a bottom surface, the circuit board having an opening formed therein where a portion of the circuit board is absent;

a first portion of the guide rail system having a top surface and a bottom surface, the top surface of the first portion being secured to the bottom surface of the circuit board at locations of the bottom surface of the circuit board adjacent the opening formed in the circuit board, the first portion comprising:

a back plate comprising a thermally-conductive material, the back plate having an top surface and a bottom surface; and a subassembly mounted on the top surface of the back plate, the subassembly comprising a thermally-conductive material, the subassembly comprising a plurality of pairs of parallel guide rails including a first pair of adjacent guide rails, each guide rail having a groove therein that extends along the respective guide rail, wherein each pair of guide rails defines a track that is parallel to the grooves and the guide rails, and wherein the grooves on opposite sides of each track are spaced apart by a predetermined distance; and a second portion of the guide rail system disposed on a bottom surface of a first optical communications module, the second portion comprising at least a first guide block having side edges that extend along opposite sides of the guide block, the side edges being parallel to one another and being spaced apart by approximately said predetermined distance, and wherein the side edges are slidingly engaged with the grooves of the first pair of adjacent guide rails to enable the first optical communications module to slide within the track defined by the first pair of adjacent guide rails in directions that are parallel to the grooves of the first pair of adjacent guide rails.

2. The guide rail system of claim 1, further comprising:

a heat dissipation structure secured to the bottom surface of the back plate, wherein at least some heat generated by the first optical communications module passes through the subassembly into the back plate, and wherein at least some of the heat that passes into the back plate is transferred from the back plate to the heat dissipation structure where it is dissipated.

3. The guide rail system of claim 2, further comprising:

a heat dissipation structure disposed on a top surface of the first optical communications module.

4. The guide rail system of claim 1, wherein the plurality of pairs of parallel guide rails further includes a second pair of adjacent guide rails, and wherein the second portion further comprises: at least a second guide block disposed on a bottom surface of a second optical communications module, the second guide block having side edges that extend along the second guide block parallel to one another and that are spaced apart by approximately said predetermined distance, and wherein the side edges of the second guide block are slidingly engaged with the grooves of the second pair of adjacent guide rails to enable the second optical communications module to slide within the track defined by the second pair of adjacent guide rails in directions that are parallel to the grooves of the second pair of adjacent guide rails.

5. The guide rail system of claim 1, further comprising:

a latching mechanism secured to a bottom surface of the first optical communications module for latching the first optical communications module to the first portion of the guide rail system to prevent movement of the first optical communications module, wherein no part of the latching mechanism extends outwardly from side surfaces of the first optical communications module.

6. The guide rail system of claim 1, wherein the first optical communications module is an optical transceiver module.

7. The guide rail system of claim 1, wherein the first optical communications module is an optical transmitter module.

8. The guide rail system of claim 1, wherein the first optical communications module is an optical receiver module.

9. A guide rail system for mounting optical communications modules on a host circuit board, the guide rail system comprising:

the circuit board having a top surface and a bottom surface, the circuit board having an opening formed therein where a portion of the circuit board is absent;

a first portion of the guide rail system having a top surface and a bottom surface, the top surface of the first portion being secured to the bottom surface of the circuit board at locations of the bottom surface of the circuit board adjacent the opening formed in the circuit board, the first portion comprising:

a back plate comprising a thermally-conductive material, the back plate having an top surface and a bottom surface; and a subassembly mounted on the top surface of the back plate, the subassembly comprising a thermally-conductive material, the subassembly comprising a plurality of pairs of parallel guide rails including first and second pairs of adjacent guide rails, each guide rail having a groove therein that extends along the respective guide rail, wherein each pair of guide rails defines a track that is parallel to the grooves and the guide rails, and wherein the grooves on opposite sides of each track are spaced apart by a predetermined distance; and a second portion of the guide rail system comprising at least first and second guide blocks disposed on bottom surfaces of first and second optical communications modules, respectively, the first and second guide blocks each having side edges that extend along opposite sides of the guide block, the side edges being parallel to one another, the side edges of the first guide block being spaced apart by approximately said predetermined distance and the side edges of the second guide block being spaced apart by said predetermined distance, and wherein the side edges of the first guide block are slidingly engaged with the grooves of the first pair of adjacent guide rails to enable the first optical communications module to slide within the track defined by the first pair of adjacent guide rails in directions that are parallel to the grooves of the first pair of adjacent guide rails, and wherein the side edges of the second guide block are slidingly engaged with the grooves of the second pair of adjacent guide rails to enable the second optical communications module to slide within the track defined by the second pair of adjacent guide rails in directions that are parallel to the grooves of the second pair of adjacent guide rails.

10. The guide rail system of claim 9, further comprising:

a heat dissipation structure secured to the bottom surface of the back plate, wherein at least some heat generated by the first and second optical communications modules passes from the first and second guide blocks into the subassembly, and wherein at least some of the heat that passes into the subassembly subsequently passes from the subassembly into the back plate, and wherein at least some of the heat that passes into the back plate is transferred from the back plate to the heat dissipation structure where it is dissipated.

11. The guide rail system of claim 10, further comprising: first and second heat dissipation structures disposed on top surfaces of the first and second optical communications modules, respectively.

12. The guide rail system of claim 9, further comprising: first and second latching mechanisms secured to bottom surfaces of the first and second optical communications modules, respectively, for latching the first and second optical communications module to the first portion of the guide rail system to prevent movement of the first and second optical communications module, wherein no part of the first and second latching mechanisms extends outwardly from side surfaces of the first and second optical communications module, respectively.

13. A guide rail system for mounting optical communications modules on a host circuit board, the guide rail system comprising:

the host circuit board having a top surface and a bottom surface, the circuit board having an opening formed therein where a portion of the circuit board is absent;

a first portion of the guide rail system having a top surface and a bottom surface, the top surface of the first portion being secured to the bottom surface of the circuit board at locations of the bottom surface of the circuit board adjacent the opening formed in the circuit board, the first portion comprising:

a back plate comprising a thermally-conductive material, the back plate having an top surface and a bottom surface; and a subassembly mounted on the top surface of the back plate, the subassembly comprising a thermally-conductive material, the subassembly comprising a plurality of pairs of parallel guide rails including a first pair of adjacent guide rails, each guide rail having a groove therein that extends along the respective guide rail, wherein each pair of guide rails defines a track that is parallel to the grooves and the guide rails, and wherein the grooves on opposite sides of each track are spaced apart by a predetermined distance;

a second portion of the guide rail system disposed on a bottom surface of a first optical communications module, the second portion comprising at least a first guide block having side edges that extend along opposite sides of the guide block, the side edges being parallel to one another and being spaced apart by approximately said predetermined distance, and wherein the side edges are slidingly engaged with the grooves of the first pair of adjacent guide rails to enable the first optical communications module to slide within the track defined by the first pair of adjacent guide rails in directions that are parallel to the grooves of the first pair of adjacent guide rails; and a heat dissipation structure secured to the bottom surface of the back plate, wherein at least some heat generated by the first optical communications module passes through the subassembly into the back plate, and wherein at least some of the heat that passes into the back plate is transferred from the back plate to the heat dissipation structure where it is dissipated.

14. The guide rail system of claim 13, wherein the plurality of pairs of parallel guide rails further includes a second pair of adjacent guide rails, and wherein the second portion further comprises: at least a second guide block disposed on a bottom surface of a second optical communications module, the second guide block having side edges that extend along the second guide block parallel to one another and that are spaced apart by approximately said predetermined distance, and wherein the side edges of the second guide block are slidingly engaged with the grooves of the second pair of adjacent guide rails to enable the second optical communications module to slide within the track defined by the second pair of adjacent guide rails in directions that are parallel to the grooves of the second pair of adjacent guide rails.

15. The guide rail system of claim 14, further comprising:

a heat dissipation structure disposed on a top surface of the first optical communications module.

16. The guide rail system of claim 13, further comprising:

a latching mechanism secured to a bottom surface of the first optical communications module for latching the first optical communications module to the first portion of the guide rail system to prevent movement of the first optical communications module, wherein no part of the latching mechanism extends outwardly from side surfaces of the first optical communications module.

17. A method for using a guide rail system for mounting one or more optical communications modules on a host circuit board, the method comprising:

providing the host circuit board having a top surface and a bottom surface, the circuit board having an opening formed therein where a portion of the circuit board is absent;

providing a guide rail system comprising a first portion and a second portion, the first portion of the guide rail system having a top surface and a bottom surface, the top surface of the first portion being secured to the bottom surface of the circuit board at locations of the bottom surface of the circuit board adjacent the opening formed in the circuit board, the first portion comprising a back plate and a subassembly, the back plate and the subassembly comprising a thermally-conductive material, the back plate having a top surface and a bottom surface, wherein the subassembly is mounted on the top surface of the back plate, the subassembly comprising a plurality of pairs of parallel guide rails including a first pair of adjacent guide rails, each guide rail having a groove therein that extends along the respective guide rail, each pair of guide rails defining a track that is parallel to the grooves and the guide rails, and wherein the grooves on opposite sides of each track are spaced apart by a predetermined distance, and wherein the second portion of the guide rail system comprises at least a first guide block disposed on a bottom surface of a first optical communications module, the first guide block having side edges that extend along opposite sides of the first guide block, the side edges being parallel to one another and being spaced apart by approximately said predetermined distance; and slidingly engaging the side edges of the first guide block with the grooves of the first pair of adjacent guide rails to enable the first optical communications module to slide within the track defined by the first pair of adjacent guide rails in directions that are parallel to the grooves of the first pair of adjacent guide rails.

18. The method of claim 17, further comprising:

disposing a heat dissipation structure on the bottom surface of the back plate, wherein at least some heat generated by the first optical communications module passes through the subassembly into the back plate, and wherein at least some of the heat that passes into the back plate is transferred from the back plate to the heat dissipation structure where it is dissipated.

19. The method of claim 18, further comprising:

disposing a heat dissipation structure on a top surface of the first optical communications module.

20. The method of claim 17, wherein a latching mechanism is secured to a bottom surface of the first optical communications module for latching the first optical communications module to the first portion of the guide rail system to prevent movement of the first optical communications module, wherein no part of the latching mechanism extends outwardly from side surfaces of the first optical communications module.

21. The method of claim 17, wherein the plurality of pairs of parallel guide rails further includes a second pair of adjacent guide rails, wherein the second portion of the guide rail system further comprises a second guide block that is disposed on a bottom surface of a second optical communications module, the second guide block having side edges that extend along the second guide block parallel to one another and that are spaced apart by approximately said predetermined distance, and wherein the method further comprises: slidingly engaging the side edges of the second guide block with the grooves of the second pair of adjacent guide rails to enable the second optical communications module to slide within the track defined by the second pair of adjacent guide rails in directions that are parallel to the grooves of the second pair of adjacent guide rails.

* * * * *